United States Patent
Fair et al.

(10) Patent No.: US 9,009,742 B1
(45) Date of Patent: Apr. 14, 2015

(54) VTL ADAPTIVE COMMIT

(71) Applicant: EMC Corporation, Hopkinton, MA (US)

(72) Inventors: Robert L. Fair, Cary, NC (US); Imran Khan, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 94 days.

(21) Appl. No.: 13/891,802

(22) Filed: May 10, 2013

(51) Int. Cl.
*G06F 9/54* (2006.01)
*G06F 3/06* (2006.01)

(52) U.S. Cl.
CPC .............. *G06F 9/548* (2013.01); *G06F 3/0664* (2013.01)

(58) Field of Classification Search
CPC ... G06F 3/0664; G06F 3/0682; G06F 3/0686; G06F 3/0638; G06F 3/0661; G06F 9/547
USPC ........................................................ 719/330
See application file for complete search history.

(56) References Cited

U.S. PATENT DOCUMENTS

| | | | |
|---|---|---|---|
| 2004/0153614 A1* | 8/2004 | Bitner et al. | 711/162 |
| 2011/0072321 A1* | 3/2011 | Dhuse | 714/55 |
| 2011/0273982 A1* | 11/2011 | Akirav et al. | 370/230 |

OTHER PUBLICATIONS

Lettieri, P.; Srivastava, M.B., "Adaptive frame length control for improving wireless link throughput, range, and energy efficiency," (Mar.-Apr. 1998), INFOCOM '98. Seventeenth Annual Joint Conference of the IEEE Computer and Communications Societies, pp. 564-571 [retrieved from http://ieeexplore.ieee.org/stamp/stamp.jsp?tp=&arnumber=665076].*

* cited by examiner

*Primary Examiner* — Brian W Wathen
(74) *Attorney, Agent, or Firm* — Blakely Sokoloff Taylor Zafman LLP

(57) ABSTRACT

According to one embodiment, a virtual tape library (VTL) receives a plurality of small computer system interface (SCSI) data objects, and translates the SCSI data objects into a first set of one or more remote procedure call (RPC) data objects having a first size, wherein the first size of the first RPC data set is based on a current limit maintained by the VTL. The VTL writes the first RPC data set and a first RPC commit request to a file system. The VTL receives a first RPC status corresponding to the first RPC commit from the file system, and determines a first latency time between writing the first RPC commit and receiving the first RPC status. The VTL updates the current limit based on the first latency time in order to optimize a second latency time between a second RPC commit request and a corresponding second RPC status.

24 Claims, 8 Drawing Sheets

VTL ADAPTIVE COMMIT

FIELD OF THE INVENTION

Embodiments of the present invention relate generally to storage systems, and more particularly to virtual tape libraries.

BACKGROUND

Historically, one approach to storing data is with the use of a physical tape library. A physical tape library represents a collection of physical tapes (e.g., physical magnetic tapes). Often a physical tape library may include a large number, for example thousands to hundreds of thousands, of such physical tapes. A robotic arm known as a picker may be used to select the physical tapes from slots and insert them into physical tape drives under electronic control. The physical tape library may be coupled with a network and used for network data storage. Backup software applications or other software (e.g., on network coupled computers) may be configured to use such physical tape libraries.

Virtual tape libraries (VTLs) provide an alternative to physical tape libraries. The VTLs appear to be physical tape libraries to the backup applications, or other software that utilize them (e.g., the virtual tape libraries may emulate physical tape libraries). The VTLs, however, typically do not actually store the data on physical magnetic tapes, but rather store the data on one or more hard disk drive arrays, solid state storage devices, or other types of physical storage. This offers an advantage that the VTLs do not need to rely on the mechanics or robotic arms used for physical tape libraries. Moreover, the backup applications, or other software utilizing the VTL, do not need to know that physical magnetic tapes are not being used for data storage, and do not need to be changed. This helps to avoid modifying existing backup applications and technology that has been designed to use physical tape libraries. As a further advantage, the data stored by a backup application to a virtual tape may be stored as a file of a file system, e.g., the Data Domain file system (DDFS). As such, the VTLs are generally able to take advantage of advanced file system functionalities, such as improved ability to perform data deduplication, replication, redundancy, segmenting, and/or other file system based technologies.

In the case where backup data is stored to a file system, the VTL interfaces with the file system through a file system interface. A conventional file system is a deeply pipelined system. Each component of the file system has resources (caches) to buffer and stage information as writes are processed. As long as resources are available, the file system operates with acceptable latencies. Here, latency refers to the time it takes for the file system to commit unstable data to stable storage and return a write status to the VTL. If resources, however, become unavailable in one or more phases of the file system, then latencies can temporarily become very long until resources become available. In the worst case, file system resources immediately become unavailable again, resulting in an extended period of poor latency.

The VTL interfaces with a file system as a black box. That is, the VTL is not aware of exactly which file system resources may be limited. The VTL is only aware that latencies may vary. For maximum performance, the VTL performs writes to a file system as uncommitted writes, and periodically issues a commit request to cause the file system to commit the unstable data, i.e., store the unstable data to stable storage. Typically, the amount of unstable data written between each commit request is 16-128 megabyte (MB). Because a commit request causes unstable data to move through the file system pipeline, it is sensitive to the available resources in the file system. In particular, in cases of constrained resources, the time to service a commit request can be very extensive (e.g., tens to hundreds of seconds). Typically, VTL multiplexes multiple streams of backup data into a single file system connection. This means that a potential exists that the total time to process a commit request could be several minutes. Such a long latency is problematic because it could cause the VTL to timeout.

FIG. 1 is a block diagram illustrating a write process. FIG. 1 illustrates, by way of example, data processing system 108 writing Small Computer System Interface (SCSI) data 109 to VTL 111 to backup data. VTL 111, in response, translates SCSI data 109 into Remote Procedure Call (RPC) data and writes the RPC data to file system 114. For example, VTL 111 writes RPC data 110 and RPC commit request 115 to file system 114. In response, file system returns RPC status 112 and 113 to VTL 111, indicating the status of RPC data 110 and RPC commit 115, respectively. As illustrated in FIG. 1, there is a latency 105 from the time RPC commit 115 is transmitted by VTL 111 to when RPC status 113 is received by VTL 111. Latency 105, in some instances can be quite long as described above, which can lead to VTL 111 timing out.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

According to some embodiments of the invention, a set of mechanisms and apparatuses is provided to optimize RPC writes by a VTL to a file system. In one embodiment, the VTL translates SCSI data objects from a data processing system into a set of one or more RPC data objects. In one embodiment, the size of the set of RPC data objects is limited to a current limit value maintained by the VTL. The VTL writes the set of RPC data objects to the file system, followed by a write of a RPC commit request. In response, the file system processes the RPC writes and returns a RPC status for each write. In one embodiment, the VTL determines the latency from the RPC commit request to the return of its corresponding RPC status. In one embodiment, the VTL uses the determined latency to determine an appropriate action to perform on the current limit, e.g., increase, decrease, or no action. In one embodiment, the VTL uses the updated current limit to determine the size of the next set of RPC data objects to be written to the file system.

Figure 1:
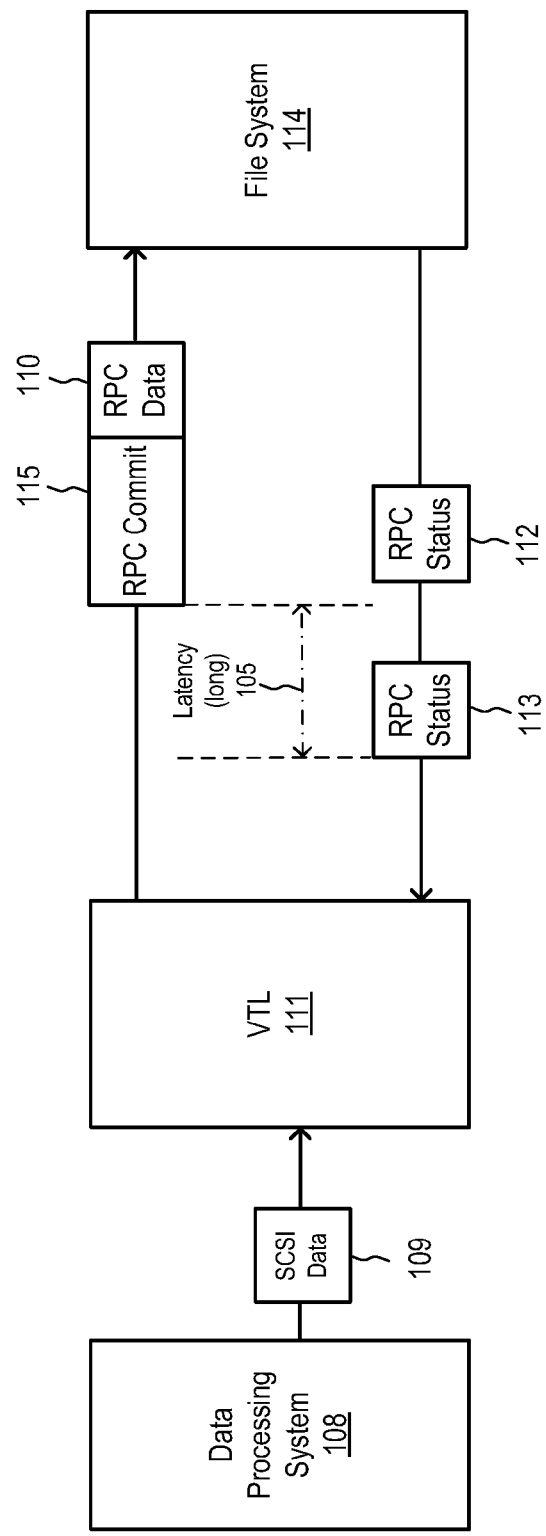
FIG. 1 is a block diagram illustrating data transfer between a VTL and a file system.
Figure 2:
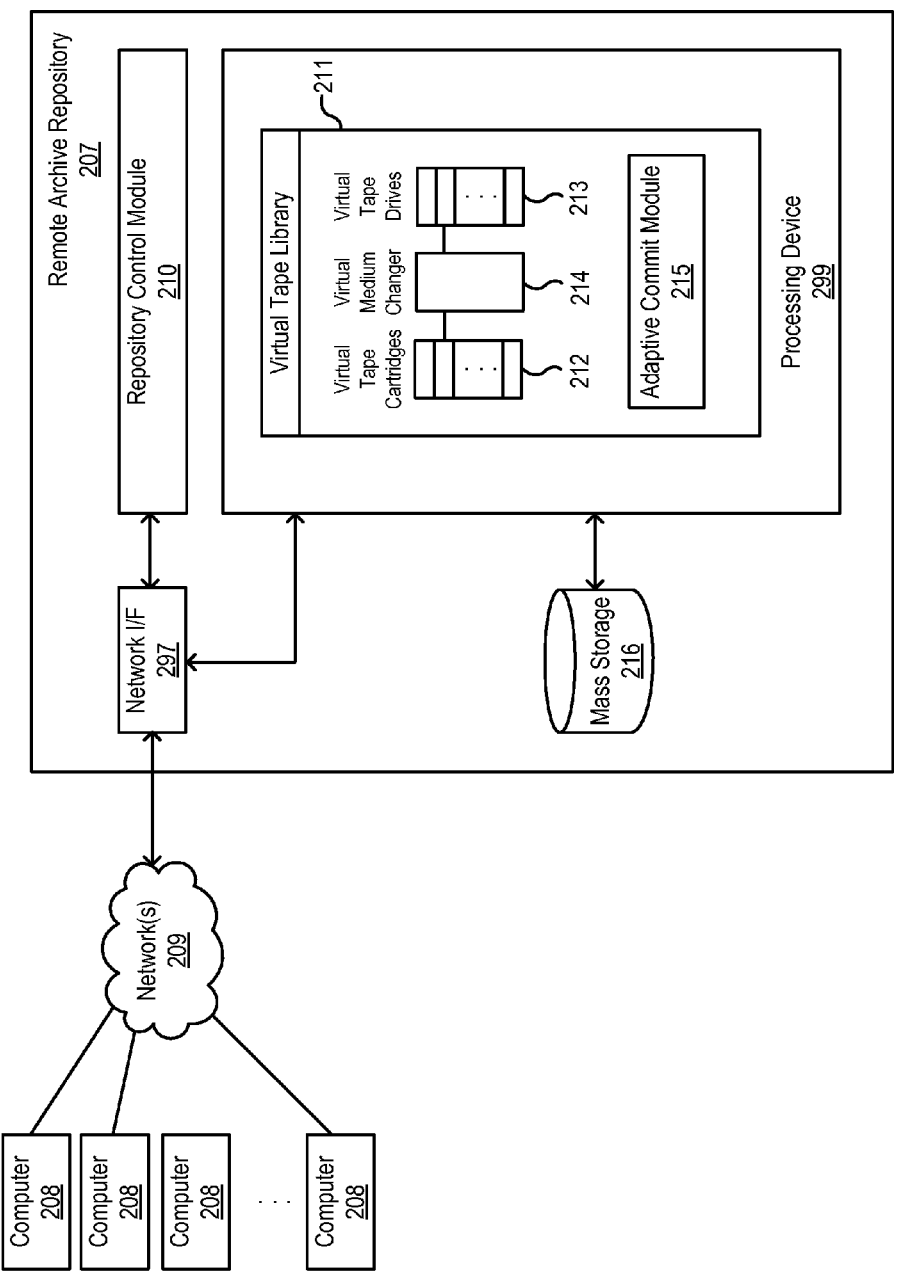
FIG. 2 is a block diagram illustrating a network storage system according to one embodiment.

FIG. 2 is a block diagram of network storage system 206 including an embodiment of remote archive repository 207 to backup or otherwise store data for a plurality of computers 208. The plurality of computers 208 are communicatively coupled with the remote archive repository 207 over one or more networks 209. While in the illustration only four computers are shown, it will be appreciated that there may be potentially a large number of such computers. Each of the computers may represent a desktop, workstation, server, portable, laptop, or other type of computer. The one or more networks 209 may represent one or more public, private, local area, wide area, wired, wireless, hybrid, or other types of networks, or a combination of different types of networks. The scope of the invention is not limited to any known type of network.

Remote archive repository 207 includes repository control module 210. Repository control module 210 may be implemented in software, firmware, hardware, or any combination thereof. Remote archive repository 207 also includes processing device 299, which may be implemented in software, firmware, hardware or any combination thereof. In one embodiment, processing device 299 includes virtual tape library (VTL) 211. VTL 211 includes a plurality of virtual tape cartridges 212, a plurality of virtual tape drives 213 to interface with virtual tape cartridges 212, and virtual medium changer 214 to virtually place virtual tape cartridges 212 in virtual tape drives 213. In one embodiment, repository control module 210 controls or manages various different operational aspects of remote archive repository 207 in generally conventional ways. In one embodiment, repository control module 210 controls or manages storage of data in VTL 211, access to data in VTL 211, and the like.

Applications (e.g., backup applications, archive applications, or other software) on each of the computers 208 may backup or otherwise store data on remote archive repository 207. The applications may determine when to store data and may transmit copies of the data over network(s) 209 to remote archive repository 207 via network interface 297. The applications may also issue commands to access the data (e.g., read and/or write data). For example, the applications may transmit Small Computer System Interface (SCSI) commands to write data to remote archive repository 207 in order to backup data. In one embodiment, VTL 211 includes adaptive commit module 215 for optimizing writes to mass storage 216. Adaptive commit module 215 is discussed in further details below.

Remote archive repository 207 also includes mass storage 216. Data of VTL 211 may ultimately, often after additional processing (e.g., deduplication, redundancy, segmenting, etc.), be stored on mass storage 216. Examples of suitable mass storage include, but are not limited to, one or more hard disk arrays, sets of magnetic disks, solid-state storage devices, physical tapes, other mass storage devices known in the arts, and combinations of such different types of mass storage. The mass storage may be either in the same or a different location as the virtual tape library depending on the particular implementation.

Figure 3:
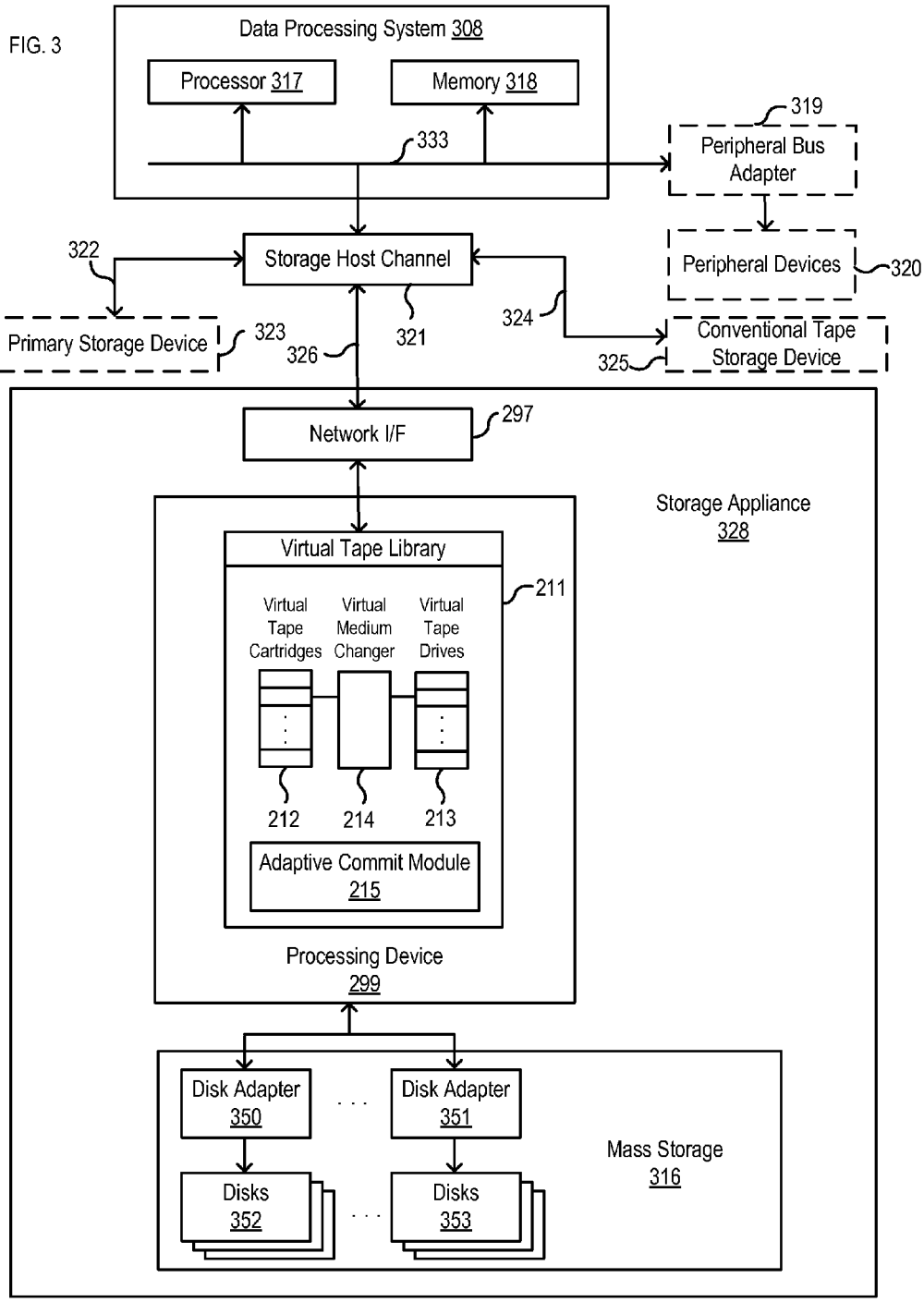
FIG. 3 is a block diagram illustrating a data processing system coupled to a storage appliance according to one embodiment.

FIG. 3 is a block diagram of data processing system 308 coupled to storage appliance 328. Data processing system 308 may be a desktop, workstation, server, laptop, or other computer, or other type of data processing system. Data processing system 308 includes processor 317 (e.g., a central processing unit (CPU)) coupled to internal memory 318 (e.g., a Dynamic Random Access Memory (DRAM)) by internal bus 333. Peripheral bus adapter/hub 319 coupled to bus 333 provides a communications path for peripheral devices 320, such as printers, local terminals, local and wide area networks, displays, graphics, additional memory or storage and the like.

Storage host controller or channel 321 coupled to bus 333 provides communications paths to a variety of different storage media. Storage host controller or channel 321 communicates through a network interface and/or directly through peripheral device busses. Channel 322 provides a communications path between storage host channel 321 and primary storage device 323 (e.g., a magnetic disk storage unit or hard disk drive). Primary storage device may store an operating system, applications, software programs, local data, or the like. Channel 324 may provide a communications path between the storage host channel 321 and conventional physical magnetic tape storage device 325. Channel 326 may provide a communications path between storage host channel 321 and storage appliance 328.

Storage appliance 328 includes VTL 211 coupled with mass storage subsystem 316. Network interface 297 is coupled with storage host channel 321 for receiving backup data from data processing system 308. VTL 211 includes virtual tape drives 213, virtual medium changer 214, virtual tape cartridges 212, and adaptive commit module 215 as described above.

Ultimately, data sent through VTL 211 may be stored on mass storage subsystem 316. This may occur after file system related operations have been performed on the data (e.g., for deduplication, redundancy, redundant array of independent disks (RAID), etc.). In one embodiment, the storage appliance is a deduplication backup appliance and performs deduplication on the data, although this is not required. The illustrated embodiment of mass storage system 316 includes multiple disk adapters 350-351, each having a corresponding array or set of magnetic or hard disks 352-353. Other embodiments may use other mass storage (e.g., a single set of hard disks, magnetic tape mass storage, semiconductor mass storage, other types of mass storage, combinations of different types of storage, etc.). This is just one illustrative example. Other embodiments may be used in either lesser (e.g., some of the illustrated components may be removed) and/or more equipped systems (e.g., additional components may be added).

Figure 4:
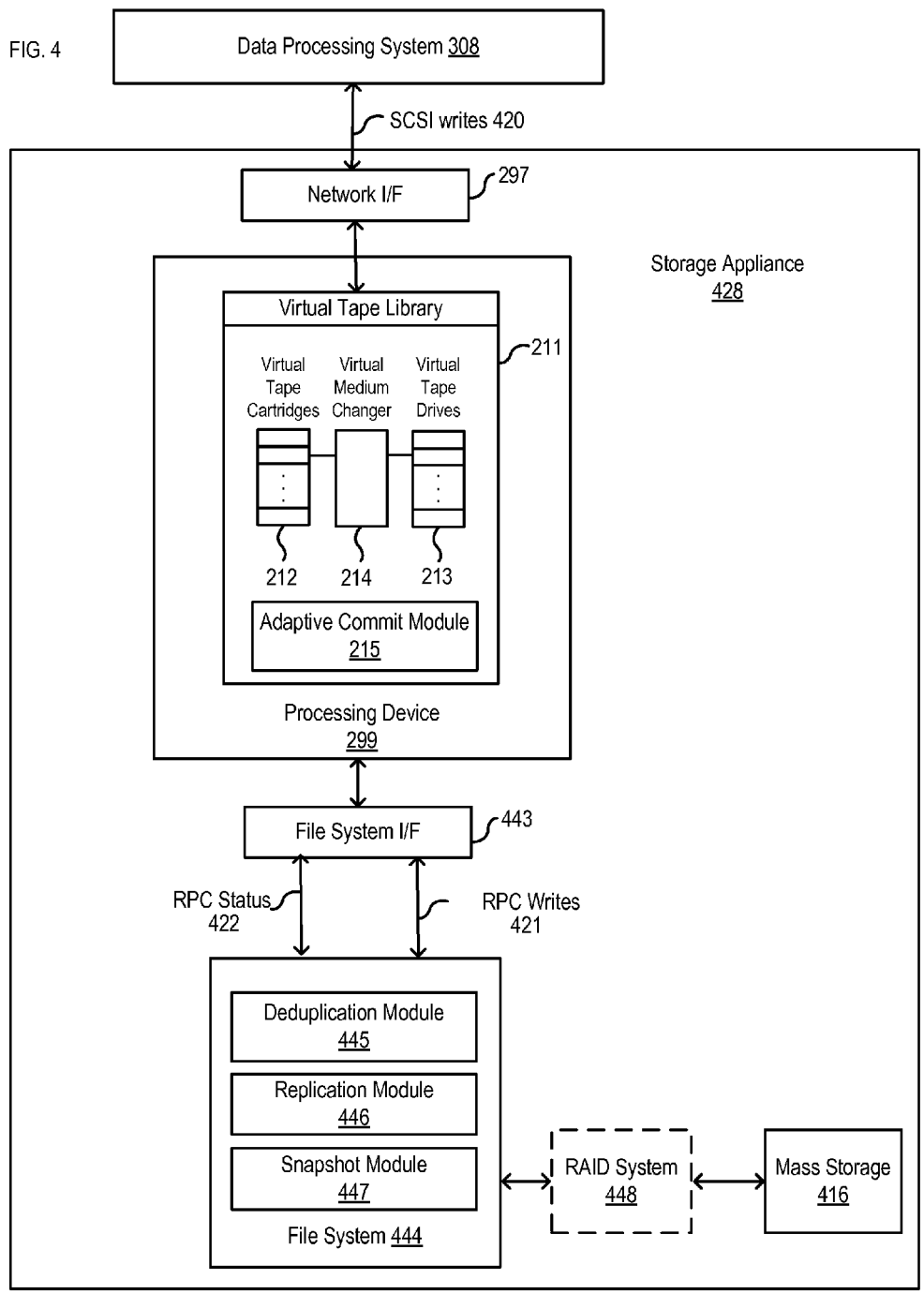
FIG. 4 is a block diagram illustrating a data processing system coupled to a storage appliance according to one embodiment.

FIG. 4 is a block diagram of storage appliance 428 coupled to data processing system 308. Data processing system 308 performs data backup by performing SCSI writes 420 to storage appliance 428. SCSI writes includes SCSI data objects that are to be stored in VTL 211, and ultimately in file system 444. Storage appliance 428, in turn, translates SCSI data objects into RPC data objects, which are written to file system 444 as part of RPC writes 421. File system 444 provides status of RPC writes back to processing device 299 via RPC status 422.

Storage appliance 428 includes processing device 299 for implementing VTL 211 as described above. VTL 211 includes virtual tape cartridges 212, virtual tape drives 213, and virtual medium changer 214 as described above. VTL 211 includes adaptive commit module 215 for optimizing RPC writes 421. As used herein, optimizing RPC writes refers to determining the frequency of writing RPC commit requests that maximizes efficiency of data transfer to file system 444 while minimizing VTL timeouts. Further details are provided below.

In one embodiment, storage appliance includes file system interface 443 for interfacing processing device 299 with file system 444. Data from VTL 211 may be stored as files (e.g., virtual tape files) through file system 444. In various embodiments, file system 444 supports any one or more of various different types of file processing operations associated with network data storage. By way of example, file system 444 may include deduplication module 445 to perform deduplication, replication module 446 to perform replication, snapshot module 447 to perform a snapshot, etc. In some embodiments, data from file system 444 may be provided to optional redundant array of independent disks (RAID) system 448. Data from RAID system 448 and/or from file system 444 may be stored on mass storage 416.

Figure 5:
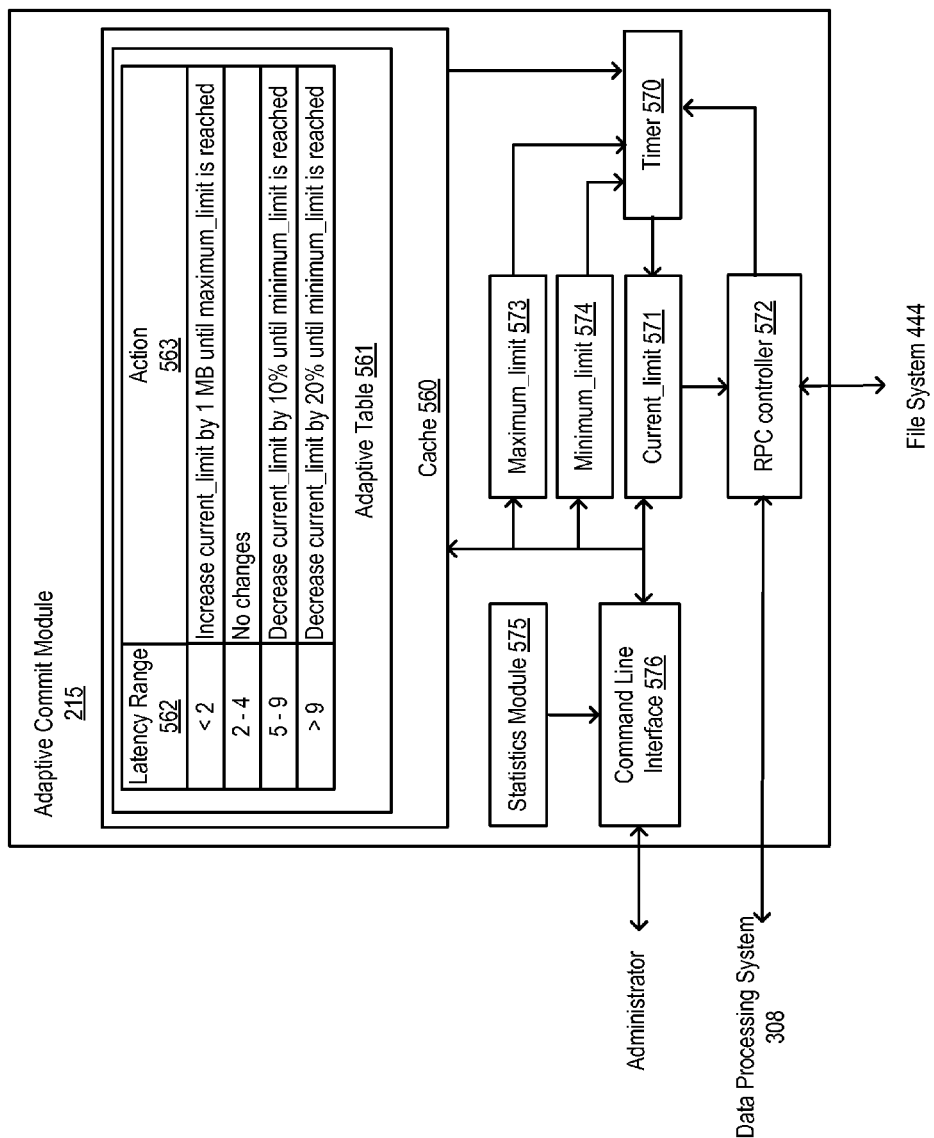
FIG. 5 is a block diagram illustrating an adaptive commit module according to one embodiment.

FIG. 5 is a block diagram illustrating adaptive commit module 215 according to one embodiment. Adaptive commit module 215 can be implemented in software, firmware, hardware, or any combination thereof. Adaptive commit module 215 is configured to optimize RPC data transfer to a file system. A RPC data transfer starts with adaptive commit module 215 receiving SCSI data objects from a backup host (e.g., data processing system 308). Adaptive commit module 215 translates the SCSI data objects into a set of one or more RPC data objects (which shall herein be simply referred to as a RPC data set). Adaptive commit module 215 writes the RPC data set, followed by a write of a RPC commit request. For each RPC commit request and RPC data object of the RPC data set written, the file system returns (i.e., transmits back to adaptive commit module 215) a corresponding RPC status.

Each RPC commit write request causes the file system to commit the written RPC data set to stable storage. The latency between the RPC write request and the corresponding RPC status depends in part on the size of the RPC data set for which the RPC commit request is being made. The larger the RPC data set, the longer the file system will take to process (i.e., write unstable data to stable storage), and thus, the longer the latency. Latency is also dictated by how busy the file system is when the RPC commit request is written. In other words, for a given RPC data set size, if the file system is busy processing other operations, the latency will be large. The latency will be smaller, however, if the file system is not busy processing other operations. Thus, data transfer is optimized if the RPC data set size is adaptive to how busy a file system currently is. The latency between a RPC commit request and a corresponding RPC status is one measure of how busy the file system is. Accordingly, adaptive commit module 215 is configured to dynamically adapt its RPC writes to the file system by monitoring the latency and adjusting the RPC data set size for subsequent RPC writes. The present mechanism to adapt RPC data set sizes to the file system has advantages over a conventional RPC write, which fixes the RPC data set size to a static value. By adapting the RPC data set size to current operating conditions of the file system, adaptive commit module 215 allows VTL 211 to utilize the file system resources as much as possible, thus increasing the efficiency of data transfer. Adaptive commit module 215, however, allows VTL 211 to backoff (i.e., issue RPC commit requests more frequently by reducing the RPC data set size,) when the file system is operating under extreme load conditions.

Figure 6:
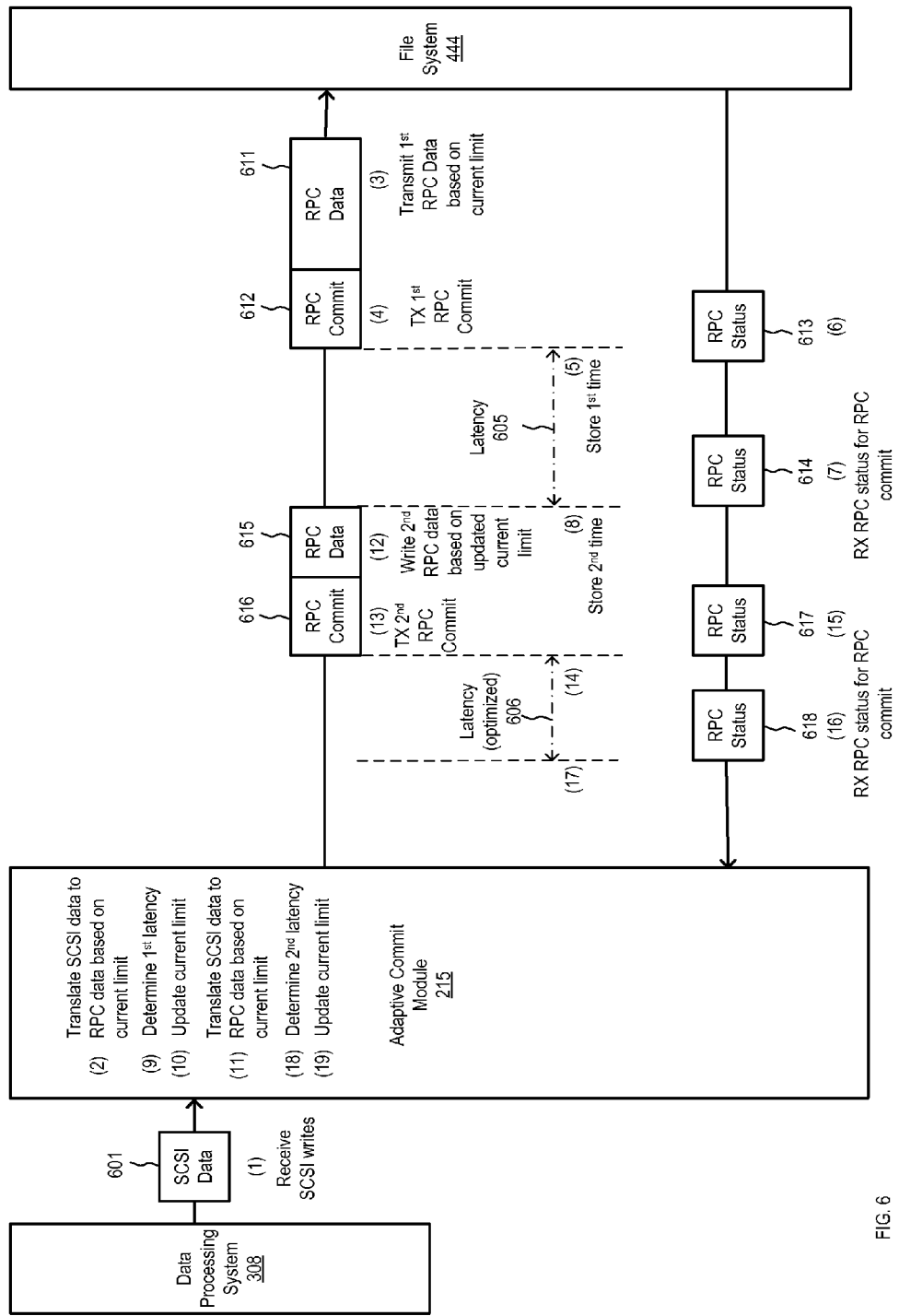
FIG. 6 is a block diagram illustrating data transfer between a VTL and a file system according to one embodiment.

Various modules of adaptive commit module 215 as illustrated in FIG. 5 will now be discussed with reference to FIG. 6. FIG. 6 is a block diagram illustrating a data transfer between data processing system 308 and adaptive commit module 215, and a data transfer between adaptive commit module 215 and file system 444, according to one embodiment.

At (1), RPC controller 572 receives SCSI data objects 601 from data processing system 308. At (2), RPC controller 572 translates backup data in SCSI format to RPC format. As used herein, translating data refers to segmenting SCSI data objects into a RPC data set having one or more RPC data objects. Translating may also refer to coalescing multiple SCSI data objects into a RPC data set having one or more RPC data objects. The type of translation performed by RPC controller 572 depends on the values of current limit 571 which serves a size limit on the RPC data set. In other words, current limit 571 determines how large the RPC data set can be, and thus determines how frequent adaptive commit module 215 must write the RPC commit requests.

At (3), once a RPC data set is ready to be written to file system 444, RPC controller 572 writes it to file system 444. For example, RPC controller 572 writes the RPC data set as RPC data 611 to file system 444. As illustrated in FIG. 6, RPC data set 611 includes only one RPC data object. It will be appreciated, however, that RPC data set 611 may include multiple RPC data objects, as long as the total size of the RPC data set does not exceed current limit 571.

At (4), RPC controller 572 writes RPC commit request 612 to request file system 444 to commit RPC data 611 to stable storage. At (5), RPC controller 572 stores the current value of timer 570 as a start time value. Timer 570 continues to update as RPC controller 572 continues to wait for the corresponding RPC status from file system 444. In one embodiment, timer 570 counts up. In an alternative embodiment, timer 570 counts down. Timer 570 can be implemented at any resolution.

At (6), file system 444 transmits RPC status 613 to RPC controller 572. RPC status 613 provides the write status of RPC data 611. At (7), file system 444 transmits RPC status 614, which provides the write status for RPC commit request 612. At (8), when RPC status 614 is received by RPC controller 572, RPC controller 572 stores the current value of timer 570 as the done time value. At (9), RPC controller 572 determines latency 605 between RPC commit 612 and corresponding RPC status 614 based on the stored start time and done time. By way of example, in an embodiment where timer 570 counts up, latency 605 is determined by subtracting start time from done time. In an embodiment where timer 570 counts down, latency 605 is determined by subtracting done time from start time. In various embodiments, saturation of timer 570 must also be taken into account.

At (10), RPC controller 572 updates current limit 571 in order to optimize the latency for the next RPC write. In one embodiment, RPC controller 572 uses latency 605 to perform a lookup of adaptive table 561, which is stored as part of cache 560. In one embodiment, adaptive table 561 includes latency range portion 562, which includes one or more latency ranges. Adaptive table 561 also includes action portion 563, which includes a corresponding action for each of the latency ranges in latency range portion 562.

By way of example, FIG. 5 illustrates latency range portion 562 as having four latency ranges, and action portion 563 as having four corresponding actions. The latency ranges, as illustrated, include a latency range that is less than two (<2) units, a latency range of two to four (2-4) units, a latency range of five to nine (5-9) units, and a latency range of greater than nine (>9) units. In one embodiment, unit is in seconds. As illustrated, action portion 563 includes an action to "increase current limit 571 by 1 MB until current limit 571 reaches a value stored in maximum limit 573". This action, for example, corresponds to latency range (>2). Action portion 563 is also illustrated as having a "no change" action. For example, this action may correspond to latency range (2-4). Action portion 563 is also illustrated as having an action to "decrease current limit 571 by 10% until current limit reaches the value stored in minimum limit 574". For example, this action may correspond to range (5-9). Finally, action portion 563 is illustrated as having an action to "decrease current limit 571 by 20% until current limit 571 reaches minimum limit 574". For example, this action may correspond to latency range (>9).

In one embodiment, the latency ranges of latency range portion 562, and the actions of action portion 563 are programmable, e.g., by a system administrator via command line interface (CLI) 576. Adaptive table 561 is illustrated in FIG. 5 only for illustrative purposes, and not intended to be a limitation of the present invention. One having ordinary skill in the art would appreciate that more or less latency ranges/actions may be included in adaptive table 561. It will be further appreciated that other latency ranges may be programmed, and various other actions may be implemented without departing from the broader scope and spirit of the present invention.

Referring now back to (10). In one embodiment, RPC controller 572 updates current limit 571 by determining which range latency 605 belongs to (i.e., falls within). Once the latency range is determined, RPC controller 572 determines the corresponding action of action portion 563. The action is then performed on current limit 571. By way of example, if latency 605 is 5, RPC controller 572 determines that latency 605 falls within the third latency range (i.e., "5-9" range) of latency portion 562. Next, RPC controller 572 determines that the third action of action portion 563 corresponds to the third latency range, and applies the action to current limit 571. In this example, RPC controller 572 decreases current limit 571 by 10% of its current value, until current limit 571 reaches minimum limit 574. In other words, current limit 571 cannot be decreased to a value which is less than the value of minimum limit 574.

At (11), RPC controller 572 translates pending SCSI data objects into a second RPC data set, such that the second RPC data set cannot have a size greater than the updated current limit 571. At (12), RPC controller 572 writes the second RPC data set as RPC data set 615 to file system 444. As illustrated, RPC data set 615 includes one RPC data object. At (13), RPC controller 572 writes RPC commit request 616, requesting file system 444 to commit RPC data set 615 to stable storage. At (14), RPC controller 572 stores the current value of timer 570 as a start time value. Timer 570 continues to update as RPC controller 572 continues to wait for the corresponding RPC status from the file system.

At (15), file system 444 transmits RPC status 617 to RPC controller 572, which indicates the write status of RPC data set 615. At (16), file system 444 transmits RPC status 618 to RPC controller 572, which indicates the write status of RPC commit request 616. At (17), when RPC status 618 is received by RPC controller 572, RPC controller 572 stores the current value of timer 570 as the done time value. At (18), RPC controller 572 determines latency 606 between RPC commit request 616 and corresponding RPC status 618 based on the stored start time and done time as described above. At (19), RPC controller 572 updates current limit 571 based on latency 606 using the mechanism described above.

It is clear from the above description that adaptive commit module 215 provides advantages over a conventional RPC write, where the RPC data set size is static. With adaptive commit module 215, VTL 211 is able to adapt RPC writes to the current operating conditions of the file system. Adaptive table 561 can be programmed so that current limit 571 is slowly increased until the latency reaches an acceptable steady range. If the latency becomes too large, then current limit 571 is more rapidly decreased.

Referring now to FIG. 5. In one embodiment, adaptive commit module 215 includes statistics module 575. In one embodiment, statistics module 575 includes a first set of counters, where the number of counters equal the number of latency ranges in latency range portion 562. For example, for adaptive table 561 as illustrated in FIG. 5, there are four counters in the first set of counters. In one embodiment, each time a latency (e.g., latency 605 or latency 606) falls within a latency range, its corresponding counter is incremented to track the number of latencies that have fallen within the range.

In one embodiment, statistics module 575 also includes a second set of counters to keep track of the number of RPC commit requests that have been written at various values of current limit 571. These counters allow a display of a histogram of the number of RPC commit requests that are written at various values of current limit 571. In one embodiment, statistics module 575 displays statistics via CLI 576. The following is a sample output that can be displayed via CLI 576 using the sets of counters discussed above:

VTC Commit Time Band Counts:
Less than 2 seconds: 11166
2 to 4 seconds: 233
5-9 seconds: 0
Greater than 9 seconds: 0

| | | | VTC Commit Histogram | | | | | |
|---|---|---|---|---|---|---|---|---|
| Mean | Std-Dev | <16 MB | <24 MB | <32 MB | <48 MB | <64 MB | <96 MB | <128 MB |
| 72 | 7 | 0 | 9 | 0 | 0 | 189 | 11232 | 0 |

Each of the counters discussed above has a maximum count value that they can reach. In one embodiment, when a counter has reached its maximum count value, the counter saturates, i.e., it will not increment any further. This prevents the counters from "rolling over" and starting from zero again.

In one embodiment, adaptive commit module 215 includes CLI 576. CLI 576 is configured to allow a system administrator to access various modules within adaptive commit module 215. For example, a system administrator reads the current counter values of statistics module 575 via CLI 576.

In one embodiment, a read access to a counter of statistics module 575 automatically clears/resets the counter to zero. In an alternate embodiment, a system administrator must explicit write zeros to the counter via CLI 576 in order to reset it to zero.

In one embodiment, CLI 576 also allows a system administrator to access adaptive table 561, e.g., to program the latency ranges and actions. In one embodiment, CLI 576 also allows a system administrator to read and/or write to current limit 571, maximum limit 573, and minimum limit 574. In one embodiment, these limits may be programmed to initial default values based on known resources availability of known storage devices. For example, current storage devices are known to have resources that permit current limit 571 to be programmed with a default value somewhere between 16 MB to 128 MB. The lower and upper bounds of such a known range can also serve as default values for minimum limit 573 and maximum limit 574, respectively.

In one embodiment, adaptive commit module 215 can be configured by a system administrator such that current limit 571 is not dynamically updated based on the determined latencies. In such an embodiment, adaptive commit module 215 writes RPC data sets that have a fixed size equal to current limit 571.

Figure 7:
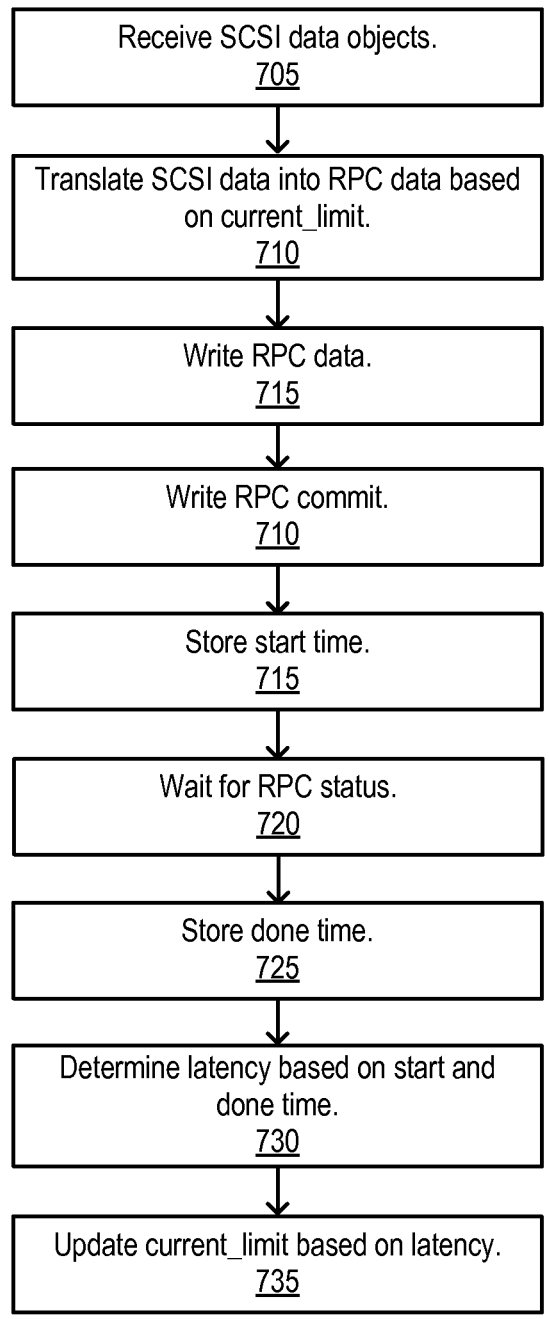
FIG. 7 is a flow diagram illustrating a method for performing adaptive RPC writes according to one embodiment.

FIG. 7 is a flow diagram illustrating method 700 for maintaining performing adaptive RPC writes according to one embodiment. For example, method 700 can be performed by adaptive commit module 215 of VTL 211. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams. Method 700 can be implemented in software, firmware, hardware, or any combination thereof.

Method 700 will now be discussed with reference to FIG. 6. At block 705, adaptive commit module 215 receives SCSI data objects from a data processing system. For example, at (1), adaptive commit module 215 receives SCSI data object 601 from data processing system 308. At block 710, adaptive commit module 215 translates SCSI data objects into a RPC data set based on current limit 571. For example, at (2), adaptive commit module 215 translates SCSI data objects 601 into RPC data set 611.

At block 715, adaptive commit module 215 writes RPC data set to a file system. For example, at (3), adaptive commit module writes RPC data set 611 to file system 444. At block 710, adaptive commit module 215 writes a RPC commit request to the file system. For example, at (4), adaptive commit module 215 writes RPC commit request 612 to file system 444. At block 715, after writing the RPC commit request, adaptive commit module 215 stores a start time. For example, at (5), adaptive commit module stores a first time value.

At block 720, adaptive commit module 215 waits for RPC status from the file system. At block 725, after receiving the RPC status corresponding to the RPC commit request, adaptive commit module 215 stores a done time. For example, at (8), after receiving RPC status 614 corresponding to RPC commit request 612, adaptive commit module stores a second time value.

At block 730, adaptive commit module 215 determines the latency between the RPC commit request and its corresponding RPC status based on the stored start and done time. For example, at (9), adaptive commit module determines latency 605 based on the time stored at (5) and the time stored at (8). At block 735, adaptive commit module 215 updates current limit 571 based on the determined latency. For example, at (10), adaptive commit module 215 updates current limit 571 based on latency 605.

Figure 8:
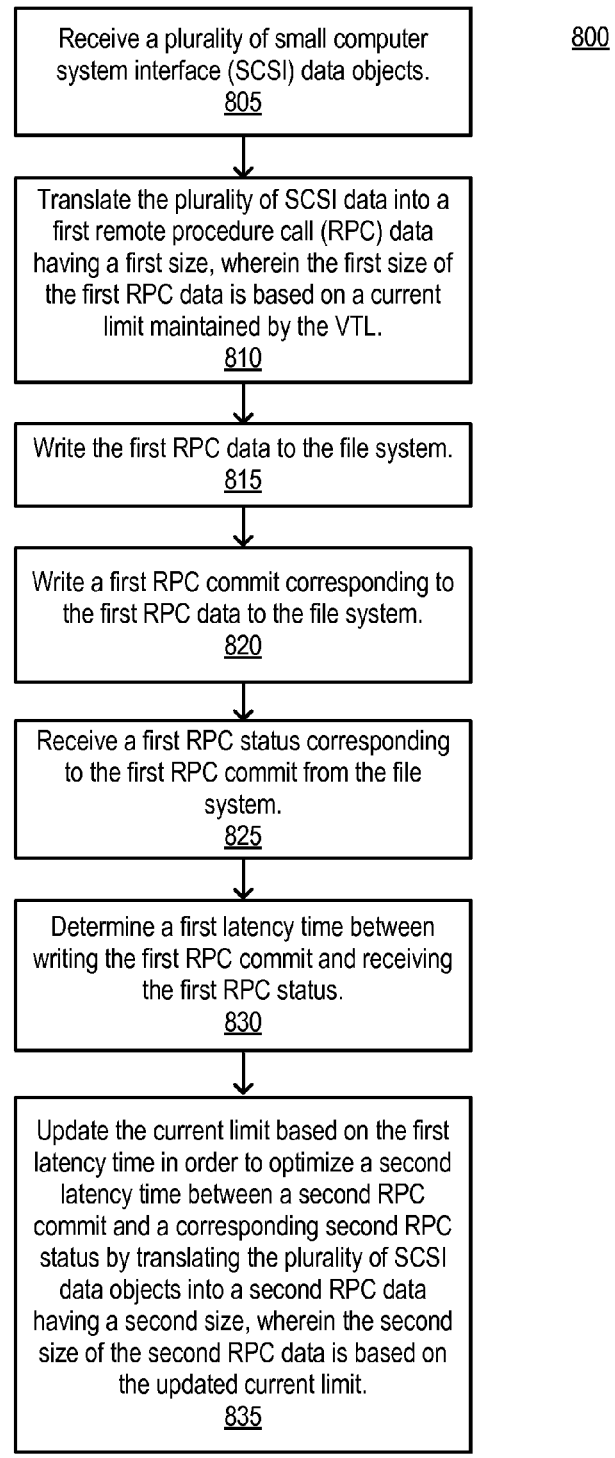
FIG. 8 is a flow diagram illustrating a method for performing adaptive RPC writes according to one embodiment.

FIG. 8 is a flow diagram illustrating method 800 for performing adaptive RPC writes according to one embodiment. For example, method 800 can be performed by adaptive commit module 215 of VTL 211. Method 800 may be performed in software, firmware, hardware, or any combination thereof. Method 800 will now be discussed with reference to FIG. 6. At block 805, adaptive commit module 215 receives a plurality of SCSI data objects. For example, at (1), adaptive commit module 215 receives SCSI data objects 601 from data processing system 308.

At block 810, adaptive commit module 215 translates the plurality of SCSI data into a first set of one or more RPC data objects having a first size, wherein the first size of the first set of RPC data objects is based on a current limit maintained by the VTL. For example, at (2), adaptive commit module 215 translates SCSI data objects 601 into RPC data set 611. At block 815, adaptive commit module 215 writes the first set of RPC data objects to the file system. For example, at (3), adaptive commit module 215 writes RPC data set 611 to file system 444.

At block 820, adaptive commit module writes a first RPC commit corresponding to the first set RPC data objects to the file system. For example, at (4), adaptive commit module 215 writes RPC commit request 612 to file system 444. At block 825, adaptive commit module 215 receives a first RPC status corresponding to the first RPC commit from the file system. For example, at (7), adaptive commit module 215 receives RPC status 614 corresponding to RPC commit request 612.

At block 830, adaptive commit module 215 determines a first latency time between writing the first RPC commit and receiving the first RPC status. For example, at (9), adaptive commit module 215 determines latency 605 between the writing of RPC commit request 612 and receiving of RPC status 614.

At block 835, adaptive commit module 215 updates the current limit based on the first latency time in order to optimize a second latency time between a second RPC commit and a corresponding second RPC status by translating the plurality of SCSI data objects into a second set of one or more RPC data objects having a second size, wherein the second size of the second set of RPC data objects is based on the updated current limit. For example, at (10), adaptive commit module 215 updates current limit 571 based on latency 605.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An electronic device (e.g., a computer, an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for performing adaptive writes by a virtual tape library (VTL) of a storage appliance to a file system, the method comprising:
   receiving a plurality of small computer system interface (SCSI) data objects;
   translating the plurality of SCSI data objects into a first set of one or more remote procedure call (RPC) data objects having a first size, wherein the first size of the first set of RPC data objects is based on a current limit maintained by the VTL;
   writing the first set of RPC data objects to the file system;
   writing a first RPC commit corresponding to the first set RPC data objects to the file system;
   receiving a first RPC status corresponding to the first RPC commit from the file system;
   determining a first latency time between writing the first RPC commit and receiving the first RPC status; and
   updating the current limit based on the first latency time in order to optimize a second latency time between a second RPC commit and a corresponding second RPC status by translating the plurality of SCSI data objects into a second set of one or more RPC data objects having a second size, wherein the second size of the second set of RPC data objects is based on the updated current limit.

2. The method of claim 1, wherein translating the plurality of SCSI data objects into the second set of RPC data objects comprises coalescing two or more SCSI data objects of the plurality of SCSI data objects into the second set of RPC data objects, wherein the second set of RPC data objects has a size not greater than the updated current limit.

3. The method of claim 1, wherein translating the plurality of SCSI data objects into the second set of RPC data objects comprises segmenting a first SCSI data object of the plurality of SCSI data objects into the second set of RPC data objects, wherein the second set of RPC data objects has a size not greater than the updated current limit.

4. The method of claim 1, wherein determining the first latency time comprises:
   storing a first time value after writing the first RPC commit to the file system;
   storing a second time value, responsive to receiving the first RPC status; and
   determining the first latency time based on the first and second time value.

5. The method of claim 4, wherein updating the current limit comprises:
   comparing the first latency time against a set of one or more latency ranges in a latency table, wherein each latency range has a corresponding action to be performed on the current limit; and
   performing an action that corresponds to a first latency range to which the first latency time falls within on the current limit.

6. The method of claim 5, wherein the action comprises:
   determining whether increasing the current limit by a predetermined size results in a current limit that is greater than a predetermined maximum limit; and
   increasing the current limit by the predetermined size, responsive to determining the resulting current limit is not greater than the predetermined maximum limit.

7. The method of claim 5, wherein the action comprises:
   determining whether decreasing the current limit by a predetermined percentage results in a current limit that is less than a predetermined minimum limit; and
   decreasing the current limit by the predetermined percentage, responsive to determining the resulting current limit is not less than the predetermined minimum limit.

8. The method of claim 1, wherein updating the current limit further comprises maintaining a number of times the first latency time is within each of the one or more latency ranges.

9. A non-transitory computer-readable storage medium having instructions stored therein, which when executed by a computer, cause the computer to perform operations for performing adaptive writes, the operations comprising:
   receiving a plurality of small computer system interface (SCSI) data objects;
   translating the plurality of SCSI data objects into a first set of one or more remote procedure call (RPC) data objects having a first size, wherein the first size of the first set of RPC data objects is based on a current limit maintained by the VTL;

writing the first set of RPC data objects to the file system;

writing a first RPC commit corresponding to the first set of RPC data objects to the file system;

receiving a first RPC status corresponding to the first RPC commit from the file system;

determining a first latency time between writing the first RPC commit and receiving the first RPC status; and updating the current limit based on the first latency time in order to optimize a second latency time between a second RPC commit and a corresponding second RPC status by translating the plurality of SCSI data objects into a second set of RPC data objects having a second size, wherein the second size of the second set of RPC data objects is based on the updated current limit.

10. The non-transitory computer-readable storage medium of claim 9, wherein translating the plurality of SCSI data objects into the second set of RPC data objects comprises coalescing two or more SCSI data objects of the plurality of SCSI data objects into the second set of RPC data objects, wherein second first set of RPC data objects has a size not greater than the updated current limit.

11. The non-transitory computer-readable storage medium of claim 9, wherein translating the plurality of SCSI data objects into the second set of RPC data objects comprises segmenting a first SCSI data object of the plurality of SCSI data objects into the second set of RPC data objects, wherein the second set of RPC data objects has a size not greater than the updated current limit.

12. The non-transitory computer-readable storage medium of claim 9, wherein determining the first latency time comprises:

storing a first time value after writing the first RPC commit to the file system;

storing a second time value, responsive to receiving the first RPC status; and determining the first latency time based on the first and second time value.

13. The non-transitory computer-readable storage medium of claim 12, wherein updating the current limit comprises:

comparing the first latency time against a set of one or more latency ranges in a latency table, wherein each latency range has a corresponding action to be performed on the current limit; and performing an action that corresponds to a first latency range to which the first latency time falls within on the current limit.

14. The non-transitory computer-readable storage medium of claim 13, wherein the action comprises:

determining whether increasing the current limit by a predetermined size results in a current limit that is greater than a predetermined maximum limit; and increasing the current limit by the predetermined size, responsive to determining the resulting current limit is not greater than the predetermined maximum limit.

15. The non-transitory computer-readable storage medium of claim 13, wherein the action comprises:

determining whether decreasing the current limit by a predetermined percentage results in a current limit that is less than a predetermined minimum limit; and decreasing the current limit by the predetermined percentage, responsive to determining the resulting current limit is not less than the predetermined minimum limit.

16. The non-transitory computer-readable storage medium of claim 9, wherein updating the current limit further comprises maintaining a number of times the first latency time is within each of the one or more latency ranges.

17. A storage appliance for performing adaptive writes to a file system, the storage appliance comprising:

a network interface configured to receive a plurality of small computer system interface (SCSI) data objects;

a file system interface configured to transmit a plurality of remote procedure call (RPC) data and RPC commits, and receive a plurality of RPC status, each RPC status corresponding to a RPC commit; and a processing device coupled to the network interface and the file system interface, configured to execute a virtual tape library (VTL), the VTL to translate the plurality of SCSI data objects into a first remote procedure call (RPC) data having a first size, wherein the first size of the first set of RPC data objects is based on a current limit maintained by the VTL, write, via the file system interface, the first set of RPC data objects to the file system, write, via the file system interface, a first RPC commit corresponding to the first set of RPC data objects to the file system, receive, via the file system interface, a first RPC status corresponding to the first RPC commit from the file system, determine a first latency time between writing the first RPC commit and receiving the first RPC status, and update the current limit based on the first latency time in order to optimize a second latency time between a second RPC commit and a corresponding second RPC status by translating the plurality of SCSI data objects into a second set of RPC data objects having a second size, wherein the second size of the second set of RPC data objects is based on the updated current limit.

18. The storage appliance of claim 17, wherein translating the plurality of SCSI data objects into the second set of RPC data objects comprises coalescing two or more SCSI data objects of the plurality of SCSI data objects into the second set of RPC data objects, wherein second first set of RPC data objects has a size not greater than the updated current limit.

19. The storage appliance of claim 17, wherein translating the plurality of SCSI data objects into the second set of RPC data objects comprises segmenting a first SCSI data object of the plurality of SCSI data objects into the second set of RPC data objects, wherein the second set of RPC data objects has a size not greater than the updated current limit.

20. The storage appliance of claim 17, wherein determining the first latency time comprises storing a first time value after writing the first RPC commit to the file system, storing a second time value, responsive to receiving the first RPC status, and determining the first latency time based on the first and second time value.

21. The storage appliance of claim 20, wherein updating the current limit comprises comparing the first latency time against a set of one or more latency ranges in a latency table, wherein each latency range has a corresponding action to be performed on the current limit, and performing an action that corresponds to a first latency range to which the first latency time falls within on the current limit.

22. The storage appliance of claim 21, wherein the action comprises determining whether increasing the current limit by a predetermined size results in a current limit that is greater than a predetermined maximum limit, and increasing the current limit by the predetermined size, responsive to determining the resulting current limit is not greater than the predetermined maximum limit.

23. The storage appliance of claim 21, wherein the action comprises determining whether decreasing the current limit by a predetermined percentage results in a current limit that is less than a predetermined minimum limit, and decreasing the current limit by the predetermined percentage, responsive to determining the resulting current limit is not less than the predetermined minimum limit.

24. The storage appliance of claim 17, wherein updating the current limit further comprises maintaining a number of times the first latency time is within each of the one or more latency ranges.

* * * * *